United States Patent
Chen et al.

(10) Patent No.: US 10,732,460 B1
(45) Date of Patent: Aug. 4, 2020

(54) REFLECTIVE LIQUID CRYSTAL DISPLAYS WITH QUANTUM DOT COLOR FILTER ARRAYS

(71) Applicant: Amazon Technologies, Inc., Seattle, WA (US)

(72) Inventors: Haiwei Chen, Santa Clara, CA (US); Seokchan Hong, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 16/165,967

(22) Filed: Oct. 19, 2018

(51) Int. Cl.
  *G02F 1/1335* (2006.01)
  *G02F 1/13357* (2006.01)
  *G02F 1/1333* (2006.01)
  *G02F 1/137* (2006.01)
  *G06F 3/044* (2006.01)

(52) U.S. Cl.
  CPC ........ *G02F 1/133617* (2013.01); *G02F 1/137* (2013.01); *G02F 1/13338* (2013.01); *G02F 1/133514* (2013.01); *G02F 1/133528* (2013.01); *G02F 1/133553* (2013.01); *G02F 1/133621* (2013.01); *G02F 2001/133614* (2013.01); *G02F 2001/133616* (2013.01); *G02F 2202/043* (2013.01); *G02F 2203/02* (2013.01); *G06F 3/044* (2013.01)

(58) Field of Classification Search
  None
  See application file for complete search history.

(56) References Cited

U.S. PATENT DOCUMENTS

2017/0031205 A1\* 2/2017 Lee .................. G02F 1/133502

\* cited by examiner

*Primary Examiner* — Richard H Kim
(74) *Attorney, Agent, or Firm* — Eversheds Sutherland (US) LLP

(57) ABSTRACT

Systems, methods, and computer-readable media are disclosed for reflective liquid crystal displays with quantum dot color filter arrays. In one embodiment, an example reflective display structure may include a quantum dot color filter array, a first substrate, a second substrate, a reflective liquid crystal layer disposed between the first substrate and the second substrate, wherein the quantum dot color filter array is disposed on a first side of the reflective liquid crystal layer, a light guide disposed on a second side of the reflective liquid crystal layer, and a light emitting diode optically coupled to the light guide.

19 Claims, 7 Drawing Sheets

REFLECTIVE LIQUID CRYSTAL DISPLAYS WITH QUANTUM DOT COLOR FILTER ARRAYS

BACKGROUND

Electronic devices may include displays to present content to users. Content may include text, images, videos, and so forth. Performance of displays may vary depending on various characteristics of displays. For example, certain displays may have better color performance or contrast ratios than other displays. In another example, certain displays may be able to output a wider range of colors, or colors with different intensities, than other displays. Similarly, certain displays may render content faster than other displays. As a result, displays may affect a user experience for users of the display. Displays that can produce brilliant images, more efficiently output color, and/or decrease rendering time for content may be desired.

Figure 1:
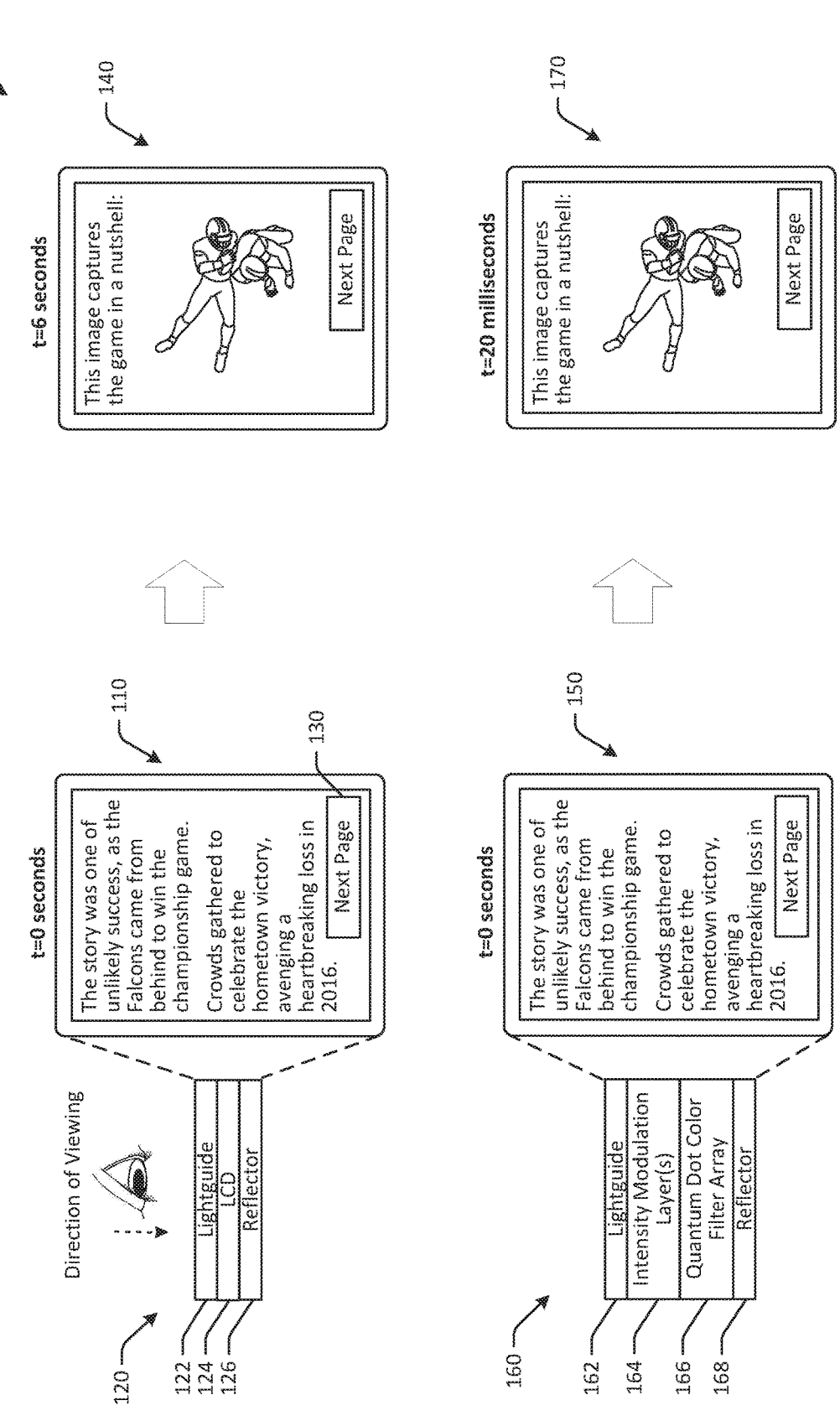
FIG. 1 is a schematic illustration of an example use case of a reflective liquid crystal display with a quantum dot color filter array in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content, such as text-based content, image-based content, video-based content, and so forth. For example, electronic devices may be configured to render locally stored content, stream content, and the like. Electronic devices may include a variety of devices, such as electronic reader (e-reader) devices, computers, smartphones, tablet computers, televisions, wearable devices, display devices, and so forth that may be used to present digital content. Electronic devices may therefore include displays that may be used to present content to users.

Devices may use various types of displays and/or different display structures to present content. Different displays may have different functionality and/or performance. For example, some displays may be black and white displays, whereas other displays may be color displays. Some displays may be reflective displays, while other displays may be transmissive displays. Display performance may include color gamut, or the range of colors that can be produced by the display, visibility in bright ambient light conditions and/or dark ambient light conditions, render time for content, color intensity or vibrancy/brilliance of colors that are rendered on the display, render time for content, and/or other performance metrics. Displays with high color gamut may be configured to output a relatively greater range of color within the visible color spectrum than other displays. For example, wide color gamut may refer to displays that can output color gamut that is wider than ITU-R Recommendation BT.709, which may be a color gamut standard for displays.

Some electronic devices may use reflective displays to present content. Reflective displays may present content by reflecting ambient light, as opposed to emitting light. As a result, reflective displays may be used, in one example, to improve consumption of content in sunlight, as glare may be reduced relative to other types of displays, thereby improving visibility. Reflective displays may have frontlight structures that include one or more lighting elements, such as diodes (e.g., laser diodes, light emitting diodes (LEDs), etc.) or any other suitable lighting element, that emits light towards an edge surface, or side surface, of a light guide. The light may propagate through the light guide, and at least a portion of the light may be directed towards a reflective display, such as a liquid crystal display (LCD) panel. The light may be reflected by the reflective display to present content.

Certain reflective displays may have low color gamut and low color conversion efficiency, and may therefore render colors with dull hues and pale tones relative to other display types. Color efficiency may be a measurement of color intensity that is lost, for example, by blocking and/or color filtering. In some instances, up to 70% of color intensity may be lost due to filtering. In addition, the time to render certain content, such as video or image content, may be greater than other display types.

Embodiments of the disclosure include display stacks having reflective LCDs with quantum dot color filter arrays. Certain embodiments may include displays with particular components and arrangements that provide high or wide color gamut and increased color conversion efficiency relative to other reflective displays. Some embodiments include one or more quantum dot arrays positioned adjacent to (e.g., "behind" or "lower," etc.) (terms such as "behind," "lower,"

"upper," "in front of," etc. are used herein for relative positioning description, and not as absolute positioning) pixelated light shuttles, such as an LCD panel. Some embodiments may use LCD panels to control incident light intensity in ambient light conditions (e.g., bright and/or sunlit conditions, etc.), thereby modulating the excitation of the quantum dot array. Some embodiments may include frontlight structures disposed adjacent to (e.g., "in front of," "on top of," etc.) an LCD panel that can be used for dark ambient light conditions. Such embodiments may include light sources, such as diodes, LEDs, etc., configured to output ultraviolet light, blue light, and/or a different short wavelength light, so as to effectively excite the quantum dot array. Some embodiments may be configured to render black and white (e.g., monochrome, etc.) content, while other embodiments may be configured to render color content and black and white content.

Referring to FIG. 1, an example use case 100 of a reflective liquid crystal display with a quantum dot color filter array is illustrated in accordance with one or more embodiments of the disclosure. In FIG. 1, a first device 110 with a first display 120 is illustrated. The first display 120 may be a typical reflective display. Specifically, the first display 120 may include a light guide 122, an LCD panel 124, and a reflector layer 126. An LED may be configured to output light that propagates through the light guide 122. At a first user interface, the first device 110 may render content, such as text content, at the first display 120. A user of the first device 110 may consume the content and select a "next page" option 130. The first device 110 may therefore render subsequent content at a second user interface 140. The content at the second user interface 140 may include, for example, an image that may be color. A time to render the second user interface 140 may be, for example, 6 seconds as indicated in FIG. 1. The time to render may be impacted by one or more of the first display 120 configuration, the type of content that is rendered, the amount and/or number of colors, and so forth. Because the user may desire to consume the content, the time to render of 6 seconds may negatively impact the user experience with the first device 110. In addition, the appearance and/or visual quality of the content at the second user interface 140 may be dull and/or lack brilliance as a result of the reflective display type of the first display 120. The cross-sectional views illustrated in FIG. 1 are of a display stack that may be viewed by a user as illustrated (e.g., direction of viewing is illustrated).

FIG. 1 also illustrates a second device 150 with a second display 160 that includes a reflective liquid crystal display with a quantum dot color filter array in accordance with one or more embodiments of the disclosure. The second display 160 may include a light guide 162, one or more intensity modulation layers 164, one or more quantum dot color filter arrays 166, and a reflector or absorber layer 168. The second display 160 may include one or more LEDs that may be disposed about an edge surface of the light guide 162. The LEDs may be configured to output or emit light having a wavelength of between about 300 nanometers to about 500 nanometers. For example, the LEDs may emit ultraviolet light or blue light in some embodiments. Light emitted from the LEDs may propagate through the light guide 162. The light guide 162 may include or be formed from one or more materials configured to direct light along a planar surface. The light guide 162 may be formed of polycarbonate material, poly(methyl methacrylate) (PMMA) material, or a different material. In some implementations, the light guide 180 may be used to frontlight the second display 160 by directing at least a portion of light from the one or more LEDs onto a portion of the reflector layer 168. Optional optically clear adhesive layers may be positioned at least partially between one or more components of the second display 160. Optically clear adhesive layers may be formed of an optically clear adhesive, and may be in liquid or solid form. In some embodiments, the optically clear adhesive may be an adhesive tape or an acrylic adhesive.

The intensity modulation layers 164 may include, in some embodiments, one or more substrates, such as support substrates, electrode substrates, etc., a liquid crystal layer or panel (which may be referred to herein as a reflective liquid crystal layer or panel), and one or more optional polarizers or polarizer layers. The intensity modulation layers 164 may be configured to modulate excitation of the quantum dot color filter array 166.

In a bright environment, ambient light may pass through the light guide 162, through the intensity modulation layers 164, and reflect off the reflector layer 168. The reflected light may excite quantum dots of the quantum dot color filter array 166. Quantum dots may be small semiconductor particles, such as semiconductor nanocrystals, and may have dimensions measured in nanometers. Quantum dots may be configured to produce light of various colors, such as green light, red light, and/or blue light with high efficiency and brilliance relative to other displays. Color output of quantum dots may be determined by a size of the respective quantum dots. Light loss and color crosstalk as a result of typical color filers may be avoided as a result of quantum dots. The light output by quantum dots may be used to render content that may be visible to a user through the light guide 162.

In dark environments, the LEDs may be used to emit blue or ultraviolet light that propagates through the light guide 162. A portion of the light may be directed towards the reflector layer 168 and the reflected light may exited the quantum dots of the quantum dot color filter array 166. As a result, content on the second display 160 may be visible in dark environments with improved quality and color conversion efficiency.

The second device 150 is illustrated with the first content rendered, as well as a second user interface 170 with the second content rendered. However, the time to render the subsequent content (e.g., after the user selects the "next page" option, etc.) at the second user interface 170 may be 20 milliseconds, or significantly less than the render time of 6 seconds. The content at the second user interface 170 may be the same content as the second user interface 140, yet the time to render may be significantly less, such as more than 5 seconds (or over 30 times) faster. The time to render may be impacted by one or more of the second display 160 configuration, the type of content that is rendered, the amount and/or number of colors, and so forth. Because the user may desire to consume the content, the time to render of 2 seconds may positively impact the user experience with the second device 150. In addition, the appearance and/or visual quality of the content at the second user interface 170 may be vibrant and/or brilliant as a result of the reflective display type of the second display 160.

Embodiments of the disclosure include reflective displays with quantum dot color filter arrays. Certain embodiments may include light guides that propagate light emitted by one or more blue and/or ultraviolet LEDs. Some embodiments may include one or more polarizers, and various configurations and/or arrangements of components of a display stack. While described in the context of reflective displays and frontlight structures, aspects of this disclosure are more broadly applicable to other forms of displays.

Example embodiments of the disclosure provide a number of technical features or technical effects. For example, in accordance with example embodiments of the disclosure, certain embodiments of the disclosure may mitigate light loss issues, reduce display stack complexity, reduce render times, and improve visibility, appearance, and/or readability of content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
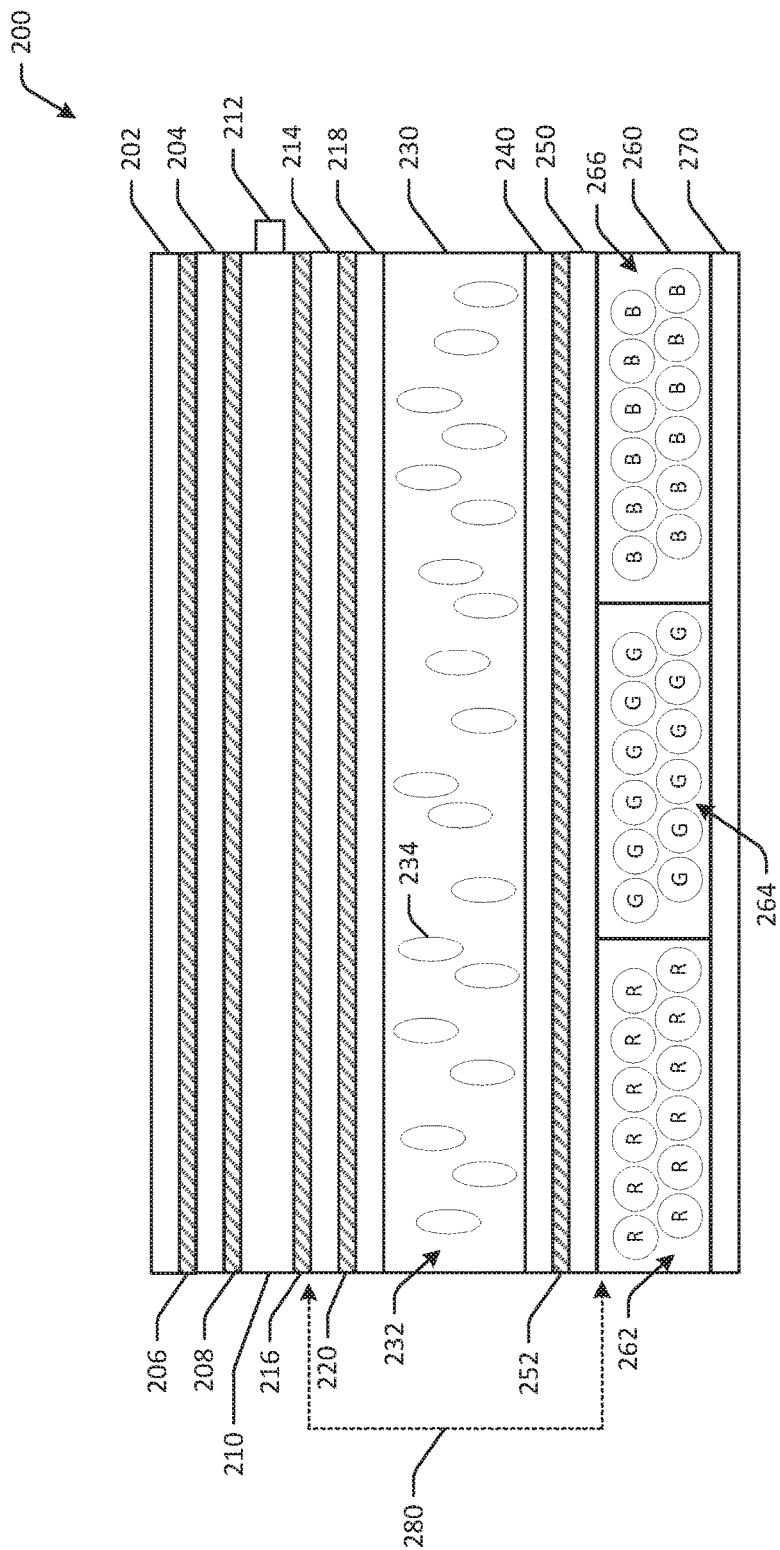
FIG. 2 is a schematic illustration of a cross-sectional view of a reflective liquid crystal display with a quantum dot color filter array in accordance with one or more embodiments of the disclosure.

FIG. 2 is a schematic illustration of a cross-sectional view of a reflective liquid crystal display with a quantum dot color filter array 200 in accordance with one or more embodiments of the disclosure. Other embodiments may include additional or fewer components. FIG. 2 illustrates an example embodiment of a display stack that includes one or more polarizers.

The reflective liquid crystal display with a quantum dot color filter array 200 may include a cover layer 202. The cover layer 202 may be a protective layer formed of, for example, clear plastic, glass, or another suitable material. The cover layer 202 may be an outermost layer (e.g., uppermost layer, etc.) of the reflective liquid crystal display with a quantum dot color filter array 200. For example, the cover layer 202 may be contacted when a user interacts with the reflective liquid crystal display with a quantum dot color filter array 200. The cover layer 202 may be formed of a translucent material in some embodiments.

The reflective liquid crystal display with a quantum dot color filter array 200 may include a touch sensor layer 204. The touch sensor layer 204 may include one or more capacitive or other touch sensors and may be formed, at least partially, of indium tin oxide and/or a uniform transparent electrode. The touch sensor layer 204 may be configured to receive touch inputs from a user. The touch sensor layer 204 may be coupled to the cover layer 202 with, for example, a first optically clear adhesive layer 206. Optically clear adhesive layers, such as the first optically clear adhesive layer 206, may be formed of an optically clear adhesive, and may be in liquid or solid form. In some embodiments, the optically clear adhesive may be an adhesive tape. In some embodiments, the optically clear adhesive may be an acrylic adhesive. In some instances, components of the display 200 may be laminated or otherwise coupled rather than using an optically clear adhesive.

A second optically clear adhesive layer 208 may be positioned between the touch sensor layer 204 and a light guide 210, and may couple the light guide 210 to the touch sensor layer 204. The light guide 210 may be disposed adjacent to the touch sensor layer 204. The light guide 210 may be configured to direct light from one or more light emitting diodes (LEDs) or other light sources across some or all of the reflective liquid crystal display 200. The light guide 210 may be formed of plastic or another material. For example, the light guide 210 may be used to illuminate the reflective liquid crystal display 200 in a dark environment, and may provide light that does not directly impinge on a viewer's eyes, so as to reduce eye strain. Some embodiments may not include a light guide 210, as the light guide 210 may be used to facilitate consumption of content in dark environments. Accordingly, the light guide 210 and/or LEDs may be optional.

One or more LEDs 212 may be optically coupled to an edge surface of the light guide 210. In some embodiments, the LEDs 212 may be coupled to the light guide 210 using an optically clear adhesive, while in other embodiments, the LEDs 212 may be physically separated from the light guide 210 by an air gap. One or more of the LEDs 212 may be configured to emit or output light of a blue color and/or ultraviolet light in some embodiments. For example, one or more of the LEDs 212 may be configured to emit light of a wavelength equal to or greater than about 300 nanometers and less than or equal to about 450 nanometers. In some embodiments, at least a portion of the LEDs 212 may be configured to output light having a wavelength of between about 300-450 nanometers, such as between about 400-450 nanometers. Other embodiments may include LEDs configured to output light having a wavelength between about 300 nm and about 350 nm, or light having a wavelength between about 400 nm and about 465 nm. The blue light and/or ultraviolet light emitted by the LEDs 212 may be relatively more effective at exciting quantum dots than light of different wavelengths.

A first polarizer 214 may be coupled to a "lower" surface (e.g., behind, etc.) of the light guide 210. The first polarizer 214 may be coupled to the light guide 210 by a third optically clear adhesive layer 216. The first polarizer 214 may be a polarizer layer and may be a film in some embodiments. The first polarizer 214 may filter at least a portion of light that passes through the light guide 210. In some embodiments, the first polarizer 214 may be a parallel polarizer. The first polarizer 214 may be disposed between a first substrate 218 and the light guide 210, and may be configured to polarize ambient light that enters the reflective liquid crystal display 200.

The first substrate 218 may be a support substrate layer and may be coupled to the first polarizer 214 by a fourth optically clear adhesive layer 220. The first substrate 218 may be configured to support a liquid crystal layer 230. In some embodiments, one or more electrodes may be disposed on the first substrate 218 and may be configured to apply a voltage to the liquid crystal layer 230. The first substrate 218 may be formed of a clear material, such as a plastic film or glass in some embodiments.

A second substrate 240 may be coupled to an opposite side of the liquid crystal layer 230 relative to the first substrate 218. The second substrate 240 may be configured to support the liquid crystal layer 230. In some embodiments, one or more electrodes may be disposed on the second substrate 240 and may be configured to apply a voltage to the liquid crystal layer 230. The second substrate 240 may be formed of a clear material, such as a plastic film or glass in some embodiments.

The liquid crystal layer 230 may be disposed between the first substrate 214 and the second substrate 240. The liquid crystal layer 230 may include one or more liquid crystals 234 that may be optionally disposed in a matrix 232. Other embodiments may have different liquid crystal arrangements. In some embodiments, a sealant may be disposed about outer sides or lateral edges of the liquid crystal layer 230. Liquid crystals 234 may be molecules arranged in a certain arrangement, such as a crystal-like arrangement. The liquid crystals 234 may either block light or allow light to pass through depending on an orientation of the liquid crystals 234. The orientation of the liquid crystals 234 may change depending on, in part, voltage applied to the liquid crystal layer 230.

A second polarizer 250 may be coupled to a "lower" surface (e.g., behind, etc.) of the second substrate 240. The second polarizer 250 may be coupled to the second substrate 240 by a fifth optically clear adhesive layer 252. The second polarizer 250 may be a polarizer layer and may be a film in some embodiments. The second polarizer 250 may filter at least a portion of light that passes through the liquid crystal layer 230. In some embodiments, the second polarizer 250 may be a perpendicular polarizer. The second polarizer 250 may be disposed between a quantum dot color filter array 260 and the second substrate 260, and may be configured to polarize light reflected by a reflector layer in some embodiments.

In some embodiments, the first polarizer 214, the first substrate 218, the liquid crystal layer 230, the second substrate 240, and the second polarizer 250 may form an intensity modulator component 280. The intensity modulator component 280 may be configured to modulate an intensity of quantum dot excitation of the quantum dot color filter array 260.

The quantum dot color filter array 260 may be disposed adjacent to the second polarizer 250. In some embodiments, the quantum dot color filter array 260 may be coupled to the second polarizer 250 with an optically clear adhesive. The quantum dot color filter array 260 may be a film, an ink printed quantum dot layer, or may have a different configuration. In some instances, such as where the quantum dot color filter array 260 is a film, the quantum dot color filter array 260 may be coupled to the second polarizer 250 with an optically clear adhesive.

The quantum dot color filter array 260 may be configured to output light in one or more colors. The quantum dot color filter array 260 may include one or more color conversion materials, such as quantum dots, perovskite, phosphor, and/or organic dyes. Other materials may be used.

In the example of FIG. 2, the quantum dot color filter array 260 may include one or more quantum dots. For example, the quantum dot color filter array 260 may include a first set of quantum dots 262 configured to emit light having a red color. The quantum dot color filter array 260 may include a second set of quantum dots 264 configured to emit light having a green color. The quantum dot color filter array 260 may include a third set of quantum dots 266 configured to emit light having a blue color. In some embodiments, rather than including the third set of quantum dots 266, a transparent material may be used as the light emitted by the one or more LEDs 212 may be of a blue color.

The respective sets of quantum dots may include quantum dots of different particle size. For example, the color of the light emitted by the respective quantum dots may be a result of the particle size of the quantum dot. Accordingly, the first set of quantum dots 262 may include semiconductor nanocrystals of a first size configured to emit monochromatic red light, the second set of quantum dots 264 may include semiconductor nanocrystals configured to emit monochromatic green light, and the third set of quantum dots 266 may include semiconductor nanocrystals configured to emit monochromatic blue light.

An optional reflector or absorber layer 270 may be disposed adjacent to the quantum dot color filter array 260. The reflector or absorber layer 270 may be formed of aluminum, silver, a different type of metal, or a different material. The reflector or absorber layer 270 may be configured to reflect or absorb ambient light and/or light emitted by the LEDs 212. In some embodiments, the reflector or absorber layer 270 may be applied directly on the quantum dot color filter array 260. In embodiments where the layer 270 is an absorber, the absorber may absorb backwards light and the layer may be formed of, for example, carbon ink. The reflector or absorber layer 270 may therefore increase color conversion efficiency.

The quantum dot color filter array 260 may be disposed on a first side of the liquid crystal layer 230. For example, the quantum dot color filter array 260 may be disposed on a relatively "lower" side of the liquid crystal layer 230, as illustrated in FIG. 2. The quantum dot color filter array 260 may not necessarily be in contact with the liquid crystal layer 230. The light guide 210 may be disposed on a second side of the liquid crystal layer 230. For example, the light guide 210 may be disposed on an "upper" side of the liquid crystal layer 230, as illustrated in FIG. 2. Accordingly, the second side may be a different side than the first side, and in some instances, the second side may be opposite the first side. The light guide 210 may not necessarily be in contact with the liquid crystal layer 230.

A total thickness of the reflective display 200 may be about 0.5 millimeters, and the illustrated drawings are not necessarily drawn to scale. Functionality of the reflective liquid crystal display 200 is discussed with respect to FIG. 3. The reflective liquid crystal display 200 may improve efficiency in color conversion and output, and increase a range of color or gamut that can be presented by the display 200.

Figure 3:
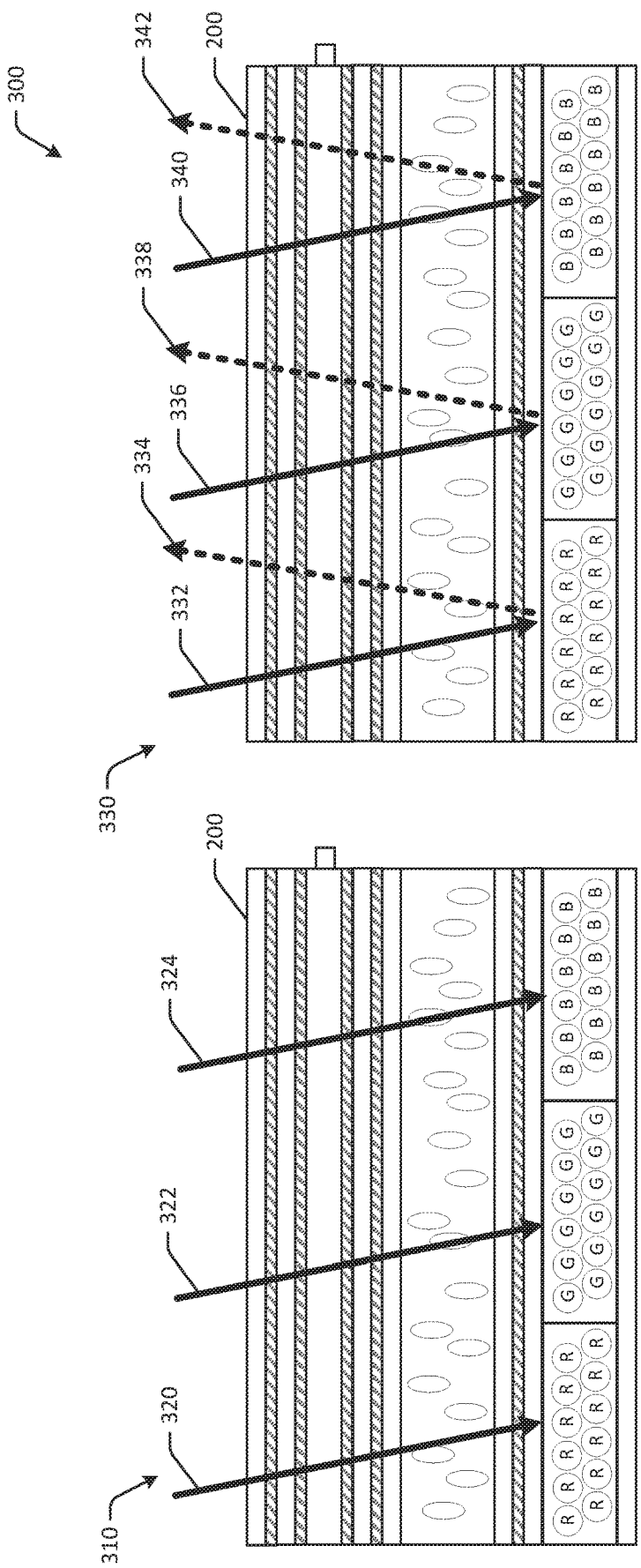
FIG. 3 is a schematic illustration of a cross-sectional view of the reflective liquid crystal display with a quantum dot color filter array of FIG. 1 in various states in accordance with one or more embodiments of the disclosure.

FIG. 3 is a schematic illustration of a cross-sectional view 300 of the reflective liquid crystal display with a quantum dot color filter array 200 of FIG. 1 in various states in accordance with one or more embodiments of the disclosure.

As discussed in conjunction with FIG. 2, the reflective liquid crystal display with a quantum dot color filter array 200 may be a display for an electronic device, such as an electronic reader device, and may include an optional reflector layer and a quantum dot color filter array. The quantum dot color filter array may include a first set of semiconductor nanocrystals configured to emit monochromatic red light, a second set of semiconductor nanocrystals configured to emit monochromatic green light, and a third set of semiconductor nanocrystals configured to emit monochromatic blue light. The quantum dot color filter array may be disposed on the reflector layer. The reflective liquid crystal display with a quantum dot color filter array 200 may include a first support substrate layer, a liquid crystal layer that includes liquid crystal molecules arranged in a matrix and configured to change orientation responsive to an applied voltage, and a second support substrate layer disposed on the liquid crystal layer. The reflective liquid crystal display with a quantum dot color filter array 200 may include one or more LEDs configured to emit blue light having a wavelength of between about 400 nanometers to about 450 nanometers, a light guide configured to propagate the blue light, the light guide disposed adjacent to a polarizer layer, a touch sensor layer disposed on the light guide, the touch sensor layer configured to receive touch input, and a cover layer disposed on the touch sensor layer.

In FIG. 3, in a dark state 310, the reflective liquid crystal display 200 may be in a dark ambient environment with little or no ambient light. In the dark state 310, 0 volts may be applied to the liquid crystal layer of the reflective liquid crystal display 200. As a result, the intensity modulator may be off, so light entering the reflective liquid crystal display 200 may be blocked. For example, a first portion of light 320 may enter the reflective liquid crystal display 200 and may pass through the various components of the reflective liquid crystal display 200, but may be blocked from exiting the reflective liquid crystal display 200, and in some instances, blocked from exciting the quantum dot color filter array. Similarly, a second portion of light 322 and a third portion of light 324 may be blocked by the liquid crystal layer of the reflective liquid crystal display 200. As a result, the light from the LEDs may be used to illuminate the reflective liquid crystal display 200.

In a bright state 330, the reflective liquid crystal display 200 may be in a bright ambient environment with ambient light, such as sunlight. In the bright state 320, up to, in one example, 15 volts may be applied to the liquid crystal layer of the reflective liquid crystal display 200. As a result, the intensity modulator may be on, so light entering the reflective liquid crystal display 200 may pass through and, in some instances, out of the reflective liquid crystal display 200. For example, a first portion of light 332 may enter the reflective liquid crystal display 200, pass through the various components of the reflective liquid crystal display 200, and may excite the quantum dot color filter array, such that first light 334 of a red color is output by the quantum dots. Similarly, a second portion of light 336 may result in second light 338 of a green color being output, and a third portion of light 340 may result in third light 342 of a blue color being output by the quantum dots. Some embodiments may include an electrode configured to apply a voltage of between about 3 volts to about 15 volts to the liquid crystal layer, where liquid crystal molecules of the liquid crystal layer are configured to pass light while the voltage is applied.

In some embodiments, a passive matrix may be used to apply voltage to the liquid crystal layer, while in other embodiments, an active matrix may be used. The reflective liquid crystal display 200 may therefore render color content in both dark and bright states with increased efficiency.

Figure 4:
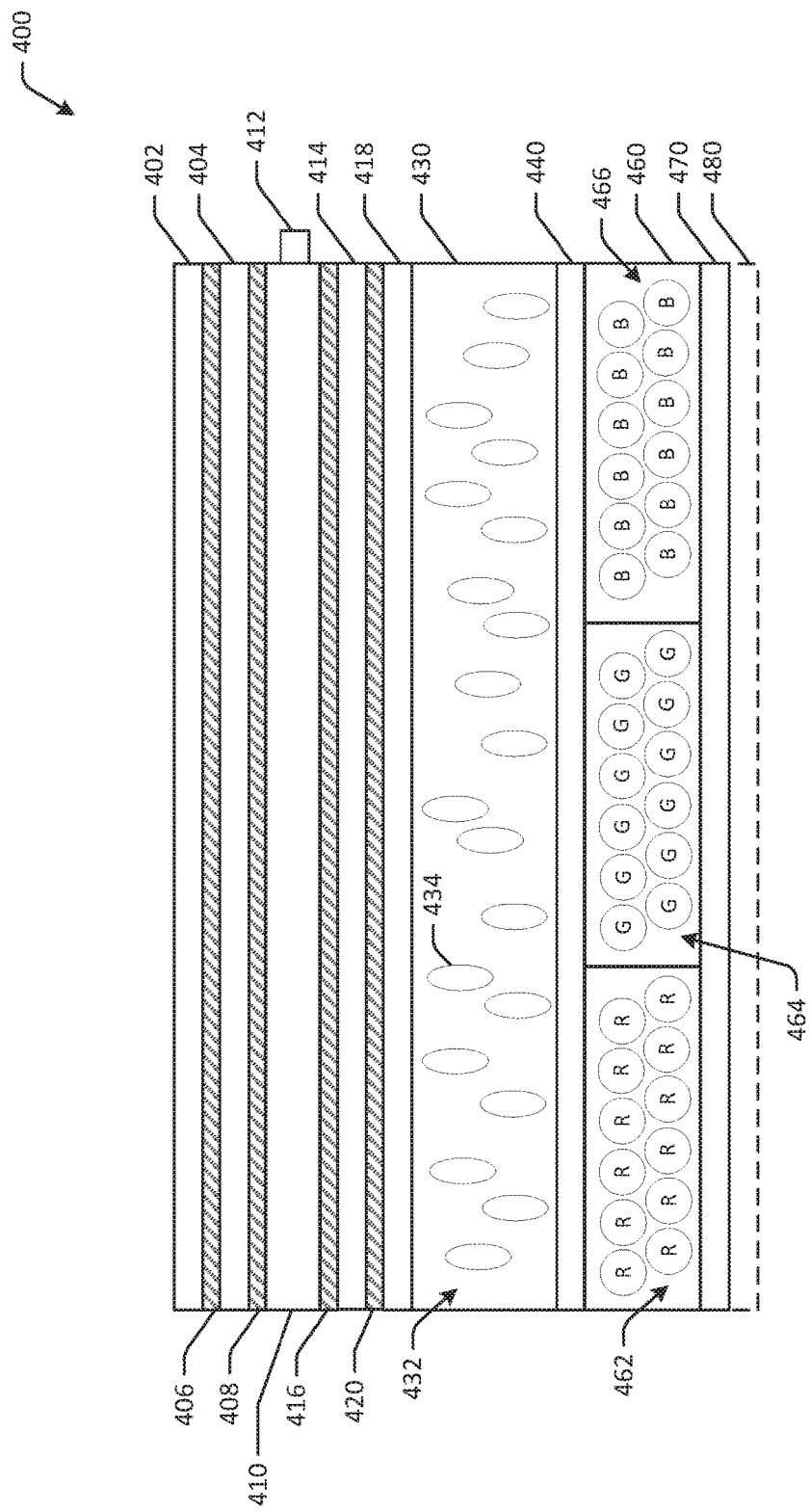
FIG. 4 is a schematic illustration of a cross-sectional view of a reflective liquid crystal display with a quantum dot color filter array with polarizers in accordance with one or more embodiments of the disclosure.

FIG. 4 is a schematic illustration of a cross-sectional view of a reflective liquid crystal display with a quantum dot color filter array with polarizers 400 in accordance with one or more embodiments of the disclosure. Other embodiments may include additional or fewer components. FIG. 4 illustrates an example embodiment of a reflective liquid crystal display that includes a quantum dot array positioned between two substrates, and includes in-cell polarizers. As a result, excitation of the quantum dots may be easier due to decreased distance between the quantum dot color filter array and the liquid crystal layer.

The reflective liquid crystal display 400 may include a cover layer 402. The cover layer 402 may be a protective layer formed of, for example, clear plastic, glass, or another suitable material. The cover layer 402 may be an outermost layer (e.g., uppermost layer, etc.) of the reflective liquid crystal display 400. A touch sensor layer 404 may be coupled to the cover layer 402 via a first optically clear adhesive layer 406. The touch sensor layer 404 may include one or more capacitive or other touch sensors and may be formed, at least partially, of indium tin oxide and/or a uniform transparent electrode. The touch sensor layer 404 may be configured to receive touch inputs from a user. Optically clear adhesive layers, such as the first optically clear adhesive layer 406, may be formed of an optically clear adhesive, and may be in liquid or solid form. In some embodiments, the optically clear adhesive may be an adhesive tape. In some embodiments, the optically clear adhesive may be an acrylic adhesive. In some instances, components of the display 400 may be laminated or otherwise coupled rather than using an optically clear adhesive.

A second optically clear adhesive layer 408 may be positioned between the touch sensor layer 404 and a light guide 410, and may couple the light guide 410 to the touch sensor layer 404. The light guide 410 may be disposed adjacent to the touch sensor layer 404. The light guide 410 may be configured to direct light from one or more light emitting diodes (LEDs) or other light sources across some or all of the reflective liquid crystal display 400. The light guide 410 may be formed of plastic or another material. Some embodiments may not include a light guide 410, as the light guide 410 may be used to facilitate consumption of content in dark environments.

One or more LEDs 412 may be optically coupled to an edge surface of the light guide 410. In some embodiments, the LEDs 412 may be coupled to the light guide 410 using an optically clear adhesive, while in other embodiments, the LEDs 412 may be physically separated from the light guide 410 by an air gap. One or more of the LEDs 412 may be configured to emit or output light of a blue color and/or ultraviolet light in some embodiments. For example, one or more of the LEDs 412 may be configured to emit light of a wavelength equal to or greater than about 300 nanometers and less than or equal to about 450 nanometers. In some embodiments, at least a portion of the LEDs 412 may be configured to output light having a wavelength of between about 300-450 nanometers, such as between about 400-450 nanometers. Other embodiments may include LEDs configured to output light having a wavelength between about 300 nm and about 350 nm, or light having a wavelength between about 400 nm and about 465 nm. The blue light and/or ultraviolet light emitted by the LEDs 412 may be relatively more effective at exciting quantum dots than light of different wavelengths.

A first substrate 414 may be a support substrate layer and may be coupled to the light guide 410 by a third optically clear adhesive layer 416. The first substrate 414 may a "top" substrate. In some embodiments, one or more electrodes may be disposed on the first substrate 414. The first substrate 414 may be formed of a clear material, such as a plastic film or glass in some embodiments.

A first polarizer 418 may be coupled to a "lower" surface (e.g., behind, etc.) of the first substrate 414. The first polarizer 418 may be coupled to the first substrate 414 by a fourth optically clear adhesive layer 420. The first polarizer 418 may be a polarizer layer and may be a film in some embodiments. The first polarizer 418 may filter at least a portion of light that passes through the light guide 410. In some embodiments, the first polarizer 418 may be an in-cell polarizer. In-cell polarizers may be polarizers disposed internally in a liquid crystal display cell. For example, a thin-crystalline-film polarizer may be used internally in liquid crystal display cells.

A liquid crystal layer 430 may be disposed adjacent to the first polarizer 418. In some embodiments, the liquid crystal layer 430 may be disposed between the first polarizer 418 and a second polarizer 440. The liquid crystal layer 430 may include one or more liquid crystals 434 that may be optionally disposed in a matrix 432. Other embodiments may have different liquid crystal arrangements. In some embodiments, a sealant may be disposed about outer sides or lateral edges of the liquid crystal layer 430. Liquid crystals 434 may be molecules arranged in a certain arrangement, such as a crystal-like arrangement. The liquid crystals 434 may either block light or allow light to pass through depending on an orientation of the liquid crystals 434. The orientation of the liquid crystals 434 may change depending on, in part, voltage applied to the liquid crystal layer 430.

The second polarizer 440 may be coupled to a "lower" surface (e.g., behind, etc.) of the liquid crystal layer 430. The second polarizer 440 may be coupled a "bottom" polarizer and may be directly to the liquid crystal layer 430. The second polarizer 440 may be a polarizer layer and may be a film in some embodiments. The second polarizer 440 may filter at least a portion of light that passes through the liquid crystal layer 430. In some embodiments, the second polarizer 440 may be an in-cell polarizer. The second polarizer 440 may be disposed between a quantum dot color filter array 460 and the liquid crystal layer 430.

The quantum dot color filter array 460 may be disposed adjacent to the second polarizer 440. In some embodiments, the quantum dot color filter array 460 may be coupled to the second polarizer 440 with an optically clear adhesive. The quantum dot color filter array 460 may be a film, an ink printed quantum dot layer, or may have a different configuration. In some instances, such as where the quantum dot color filter array 460 is a film, the quantum dot color filter array 460 may be coupled to the second polarizer 440 with an optically clear adhesive.

The quantum dot color filter array 460 may be configured to output light in one or more colors. The quantum dot color filter array 460 may include one or more color conversion materials, such as quantum dots, perovskite, phosphor, and/or organic dyes. Other materials may be used. The quantum dot color filter array 460 may include one or more quantum dots. For example, the quantum dot color filter array 460 may include a first set of quantum dots 462 configured to emit light having a red color. The quantum dot color filter array 460 may include a second set of quantum dots 464 configured to emit light having a green color. The quantum dot color filter array 460 may include a third set of quantum dots 466 configured to emit light having a blue color. In some embodiments, rather than including the third set of quantum dots 466, a transparent material may be used as the light emitted by the one or more LEDs 412 may be of a blue color.

The respective sets of quantum dots may include quantum dots of different particle size. For example, the color of the light emitted by the respective quantum dots may be a result of the particle size of the quantum dot. Accordingly, the first set of quantum dots 462 may include semiconductor nanocrystals of a first size configured to emit monochromatic red light, the second set of quantum dots 464 may include semiconductor nanocrystals configured to emit monochromatic green light, and the third set of quantum dots 466 may include semiconductor nanocrystals configured to emit monochromatic blue light.

A second substrate 470 may be coupled to an opposite side of the quantum dot color filter array 460 relative to the second polarizer 440. The second substrate 470 may be configured to support the quantum dot color filter array 460. In some embodiments, one or more electrodes may be disposed on the second substrate 470. The second substrate 470 may be formed of a clear material, such as a plastic film or glass in some embodiments.

An optional reflector or absorber layer 480 may be disposed adjacent to the second substrate 470. The reflector or absorber layer 480 may be formed of aluminum, silver, a different type of metal, or a different material. The reflector or absorber layer 480 may be configured to reflect or absorb ambient light and/or light emitted by the LEDs 412. In some embodiments, the reflector or absorber layer 480 may be applied directly on the quantum dot color filter array 460. In embodiments where the layer 480 is an absorber, the absorber may absorb backwards light and the layer may be formed of, for example, carbon ink. The reflector or absorber layer 480 may therefore increase color conversion efficiency.

Figure 5:
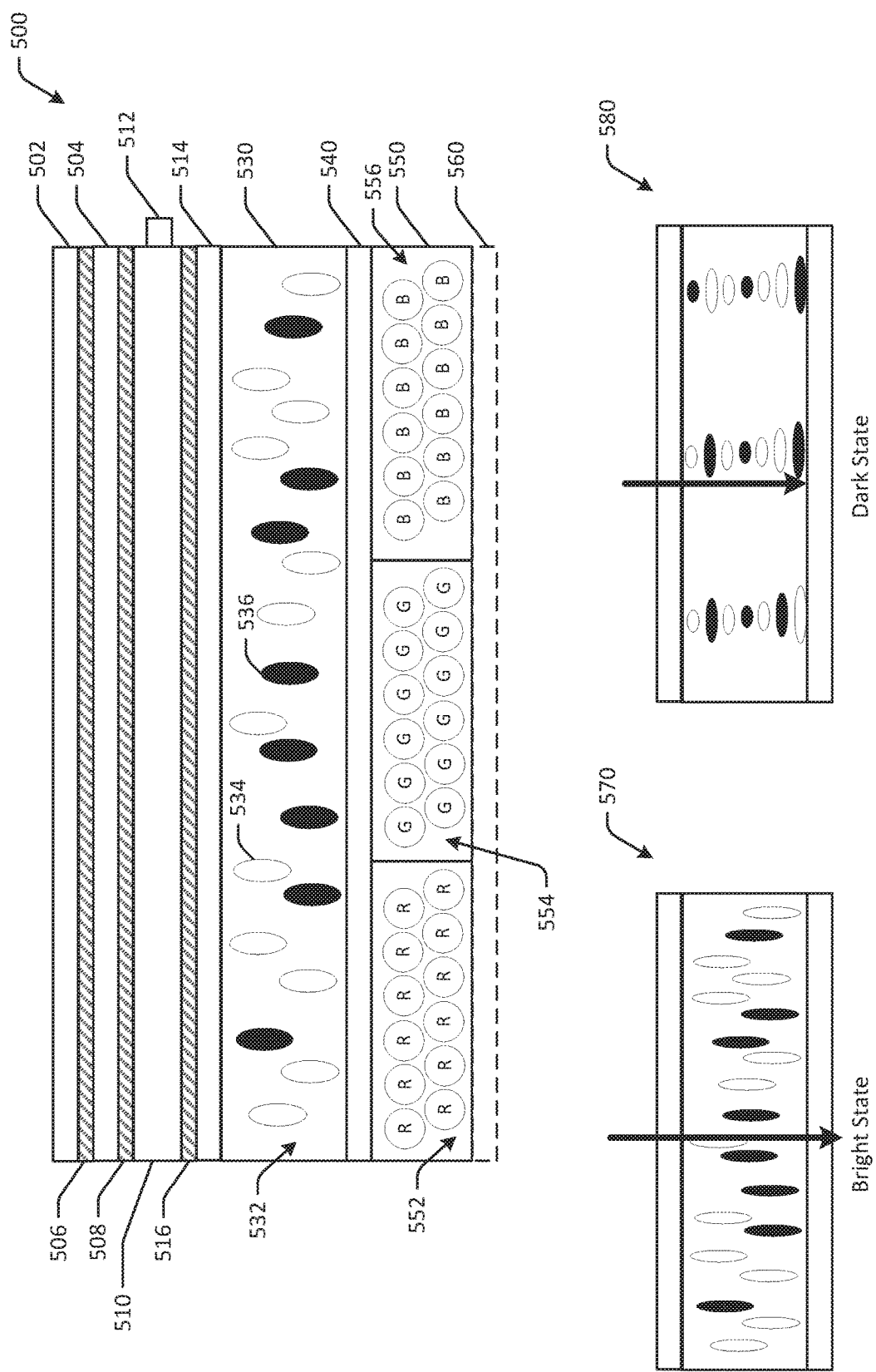
FIG. 5 is a schematic illustration of a cross-sectional view of a reflective liquid crystal display with a quantum dot color filter array and a guest-host liquid crystal panel in accordance with one or more embodiments of the disclosure.

FIG. 5 is a schematic illustration of a cross-sectional view of a reflective liquid crystal display with a quantum dot color filter array and a guest-host liquid crystal panel 500 in accordance with one or more embodiments of the disclosure. Other embodiments may include additional or fewer components. FIG. 5 illustrates an example embodiment of a reflective liquid crystal display that includes a guest-host liquid crystal panel, and does not include polarizers. As a result, the reflective display 500 may be flexible and robust, while maintaining performance.

The reflective liquid crystal display 500 may include a cover layer 502. The cover layer 502 may be a protective layer formed of, for example, clear plastic, glass, or another suitable material. The cover layer 502 may be an outermost layer (e.g., uppermost layer, etc.) of the reflective liquid crystal display 500. A touch sensor layer 504 may be coupled to the cover layer 502 via a first optically clear adhesive layer 506. The touch sensor layer 504 may include one or more capacitive or other touch sensors and may be formed, at least partially, of indium tin oxide and/or a uniform transparent electrode. The touch sensor layer 504 may be configured to receive touch inputs from a user. Optically clear adhesive layers, such as the first optically clear adhesive layer 506, may be formed of an optically clear adhesive, and may be in liquid or solid form. In some embodiments, the optically clear adhesive may be an adhesive tape. In some embodiments, the optically clear adhesive may be an acrylic adhesive. In some instances, components of the display 500 may be laminated or otherwise coupled rather than using an optically clear adhesive.

A second optically clear adhesive layer 508 may be positioned between the touch sensor layer 504 and a light guide 510, and may couple the light guide 510 to the touch sensor layer 504. The light guide 510 may be disposed adjacent to the touch sensor layer 504. The light guide 510 may be configured to direct light from one or more light emitting diodes (LEDs) or other light sources across some or all of the reflective liquid crystal display 500. The light guide 510 may be formed of plastic or another material. Some embodiments may not include a light guide 510, as the light guide 510 may be used to facilitate consumption of content in dark environments.

One or more LEDs 512 may be optically coupled to an edge surface of the light guide 510. In some embodiments, the LEDs 512 may be coupled to the light guide 510 using an optically clear adhesive, while in other embodiments, the LEDs 512 may be physically separated from the light guide 510 by an air gap. One or more of the LEDs 512 may be configured to emit or output light of a blue color and/or ultraviolet light in some embodiments. For example, one or more of the LEDs 512 may be configured to emit light of a wavelength equal to or greater than about 300 nanometers and less than or equal to about 450 nanometers. In some embodiments, at least a portion of the LEDs 512 may be configured to output light having a wavelength of between about 300-450 nanometers, such as between about 400-450 nanometers. Other embodiments may include LEDs configured to output light having a wavelength between about 300 nm and about 350 nm, or light having a wavelength between about 400 nm and about 465 nm. The blue light and/or ultraviolet light emitted by the LEDs 512 may be relatively more effective at exciting quantum dots than light of different wavelengths.

A first substrate 514 may be a support substrate layer and may be coupled to the light guide 510 by a third optically clear adhesive layer 516. The first substrate 514 may be a "top" substrate. In some embodiments, one or more electrodes may be disposed on the first substrate 514. The first substrate 514 may be formed of a clear material, such as a plastic film or glass in some embodiments.

A liquid crystal layer 530 may be disposed adjacent to the first substrate 514. In some embodiments, the liquid crystal layer 530 may be disposed between the first substrate 514 and a second substrate 540. The liquid crystal layer 530 may be a guest-host liquid crystal panel. The liquid crystal layer 530 may include one or more liquid crystals that may be optionally disposed in a matrix 532. For example, the liquid crystal layer 530 may include liquid crystals 534 that may be molecules arranged in a certain arrangement, such as a crystal-like arrangement. The liquid crystals 534 may either block light or allow light to pass through depending on an orientation of the liquid crystals 534. The orientation of the liquid crystals 534 may change depending on, in part, voltage applied to the liquid crystal layer 530.

The liquid crystal layer 530 may also include a dye material 536, such as dichroic dyes (e.g., black dichroic dye molecules, etc.). In some embodiments, the dye may be black or another dark color. Dichroic dyes may be effective because the light absorbed by the dye molecule may be absorbed generally in one direction. For example, black dichroic dye molecules may be configured to absorb light in a planar orientation and to pass light in a perpendicular orientation. The liquid crystal layer 530 may include a mixture of liquid crystals 534 and dichroic dye molecules 536. The dichroic dyes 536 may absorb the light having an electric field along a major axis or long axis of the dye. In the short axis or minor axis, the absorption may be relatively weaker. When the liquid crystal molecules change orientation, the dye may also change along with the liquid crystal molecules, consequently, the absorption axis may change, and light transmission can be modulated. The liquid crystal layer orientation in a bright state 570 and a dark state 580 is illustrated in FIG. 5. Other embodiments may have different liquid crystal arrangements. In some embodiments, a sealant may be disposed about outer sides or lateral edges of the liquid crystal layer 530.

A second substrate 540 may be coupled to an opposite side of the liquid crystal layer 530 relative to the first substrate 514. The second substrate 540 may be configured to support the liquid crystal layer 530. In some embodiments, one or more electrodes may be disposed on the second substrate 540. The second substrate 540 may be formed of a clear material, such as a plastic film or glass in some embodiments.

A quantum dot color filter array 550 may be disposed adjacent to the second substrate 540. In some embodiments, the quantum dot color filter array 550 may be coupled to the second substrate 540 with an optically clear adhesive. The quantum dot color filter array 550 may be a film, an ink printed quantum dot layer, or may have a different configuration. In some instances, such as where the quantum dot color filter array 550 is a film, the quantum dot color filter array 550 may be coupled to the second substrate 540 with an optically clear adhesive. The quantum dot color filter array 550 may be the same as the quantum dot color filter arrays described with respect to FIGS. 1-4, and may include a first set of quantum dots 552 configured to emit light having a red color. The quantum dot color filter array 550 may include a second set of quantum dots 554 configured to emit light having a green color. The quantum dot color filter array 550 may include a third set of quantum dots 556 configured to emit light having a blue color. In some embodiments, rather than including the third set of quantum dots 556, a transparent material may be used as the light emitted by the one or more LEDs 512 may be of a blue color.

An optional reflector or absorber layer 560 may be disposed adjacent to the quantum dot color filter array 550. The reflector or absorber layer 560 may be formed of aluminum, silver, a different type of metal, or a different material. The reflector or absorber layer 560 may be configured to reflect or absorb ambient light and/or light emitted by the LEDs 512. In some embodiments, the reflector or absorber layer 560 may be applied directly on the quantum dot color filter array 550. In embodiments where the layer 560 is an absorber, the absorber may absorb backwards light and the layer may be formed of, for example, carbon ink. The reflector or absorber layer 560 may therefore increase color conversion efficiency.

Figure 6:
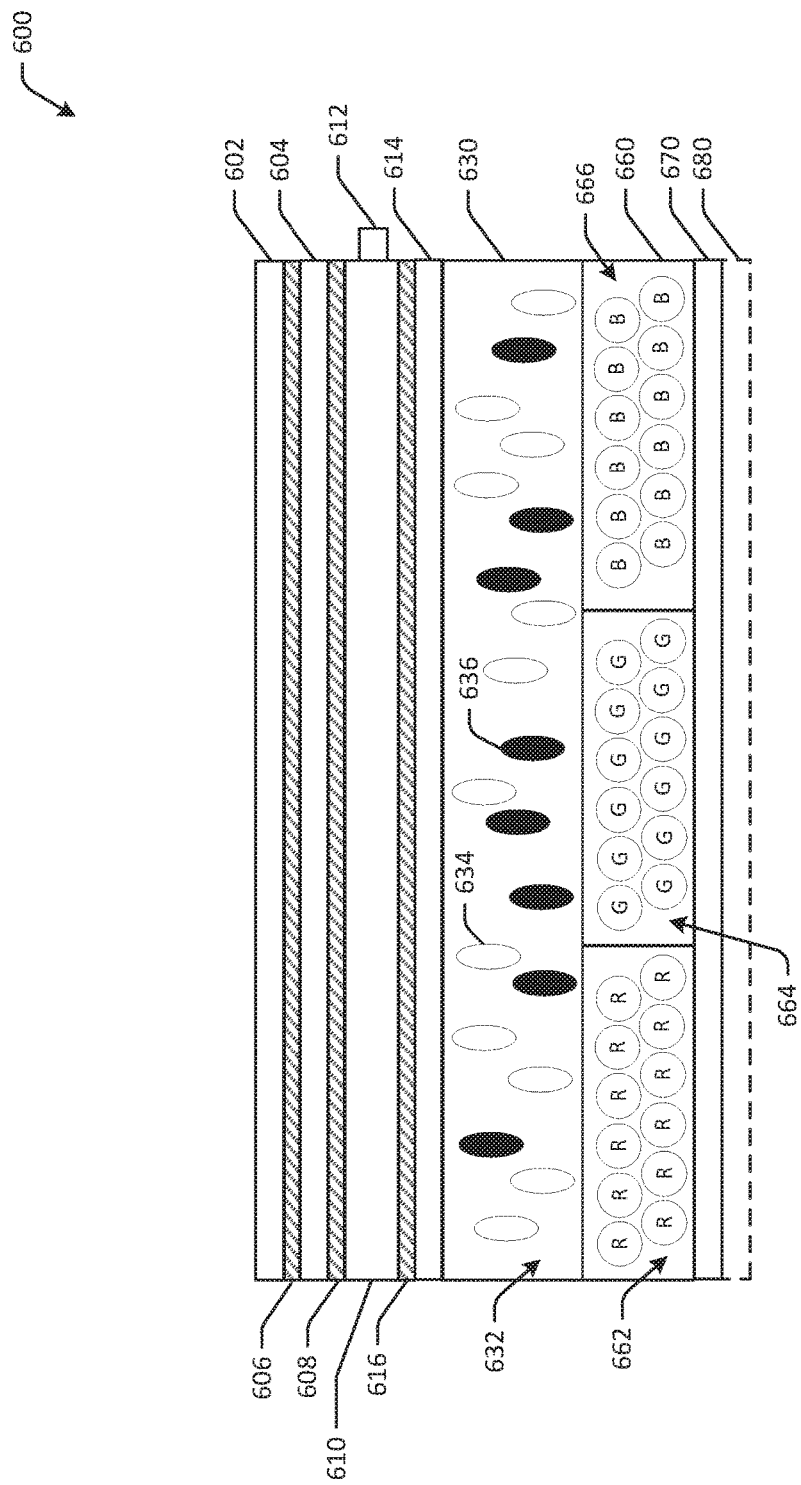
FIG. 6 is a schematic illustration of a cross-sectional view of a reflective liquid crystal display with a quantum dot color filter array and a guest-host liquid crystal panel in accordance with one or more embodiments of the disclosure.

FIG. 6 is a schematic illustration of a cross-sectional view of a reflective liquid crystal display with a quantum dot color filter array and a guest-host liquid crystal panel 600 in accordance with one or more embodiments of the disclosure. Other embodiments may include additional or fewer components. FIG. 6 illustrates an example embodiment of a reflective liquid crystal display that includes a guest-host liquid crystal panel, and a quantum dot color filter array between two substrates. As a result, the reflective display 600 may have reduced color crosstalk and increased color purity.

The reflective liquid crystal display 600 may include a cover layer 602. The cover layer 602 may be a protective layer formed of, for example, clear plastic, glass, or another suitable material. The cover layer 602 may be an outermost layer (e.g., uppermost layer, etc.) of the reflective liquid crystal display 600. A touch sensor layer 604 may be coupled to the cover layer 602 via a first optically clear adhesive layer 606. The touch sensor layer 604 may include one or more capacitive or other touch sensors and may be formed, at least partially, of indium tin oxide and/or a uniform transparent electrode. The touch sensor layer 604 may be configured to receive touch inputs from a user. Optically clear adhesive layers, such as the first optically clear adhesive layer 606, may be formed of an optically clear adhesive, and may be in liquid or solid form. In some embodiments, the optically clear adhesive may be an adhesive tape. In some embodiments, the optically clear adhesive may be an acrylic adhesive. In some instances, components of the display 600 may be laminated or otherwise coupled rather than using an optically clear adhesive.

A second optically clear adhesive layer 608 may be positioned between the touch sensor layer 604 and a light guide 610, and may couple the light guide 610 to the touch sensor layer 604. The light guide 610 may be disposed adjacent to the touch sensor layer 604. The light guide 610 may be configured to direct light from one or more light emitting diodes (LEDs) or other light sources across some or all of the reflective liquid crystal display 600. The light guide 610 may be formed of plastic or another material. Some embodiments may not include a light guide 610, as the light guide 610 may be used to facilitate consumption of content in dark environments.

One or more LEDs 612 may be optically coupled to an edge surface of the light guide 510. In some embodiments, the LEDs 612 may be coupled to the light guide 610 using an optically clear adhesive, while in other embodiments, the LEDs 612 may be physically separated from the light guide 610 by an air gap. One or more of the LEDs 612 may be configured to emit or output light of a blue color and/or ultraviolet light in some embodiments. For example, one or more of the LEDs 612 may be configured to emit light of a wavelength equal to or greater than about 300 nanometers and less than or equal to about 450 nanometers. In some embodiments, at least a portion of the LEDs 612 may be configured to output light having a wavelength of between about 300-450 nanometers, such as between about 400-450 nanometers. Other embodiments may include LEDs configured to output light having a wavelength between about 300 nm and about 350 nm, or light having a wavelength between about 400 nm and about 465 nm. The blue light and/or ultraviolet light emitted by the LEDs 612 may be relatively more effective at exciting quantum dots than light of different wavelengths.

A first substrate 614 may be a support substrate layer and may be coupled to the light guide 610 by a third optically clear adhesive layer 616. The first substrate 614 may be a "top" substrate. In some embodiments, one or more electrodes may be disposed on the first substrate 614. The first substrate 614 may be formed of a clear material, such as a plastic film or glass in some embodiments.

A liquid crystal layer 630 may be disposed adjacent to the first substrate 614. In some embodiments, the liquid crystal layer 630 may be disposed between the first substrate 614 and a quantum dot color filter array 660. The liquid crystal layer 630 may be a guest-host liquid crystal panel. The liquid crystal layer 630 may include one or more liquid crystals that may be optionally disposed in a matrix 632. For example, the liquid crystal layer 630 may include liquid crystals 634 that may be molecules arranged in a certain arrangement, such as a crystal-like arrangement. The liquid crystals 634 may either block light or allow light to pass through depending on an orientation of the liquid crystals 634. The orientation of the liquid crystals 634 may change depending on, in part, voltage applied to the liquid crystal layer 630.

The liquid crystal layer 630 may also include a dye material 636, such as dichroic dyes (e.g., black dichroic dye molecules, etc.). In some embodiments, the dye may be black or another dark color. Dichroic dyes may be effective because the light absorbed by the dye molecule may be absorbed generally in one direction. For example, black dichroic dye molecules may be configured to absorb light in a planar orientation and to pass light in a perpendicular orientation. The liquid crystal layer 630 may include a mixture of liquid crystals 634 and dichroic dye molecules 636. The dichroic dyes 636 may absorb the light having an electric field along a major axis or long axis of the dye. In the short axis or minor axis, the absorption may be relatively weaker. When the liquid crystal molecules change orientation, the dye may also change along with the liquid crystal molecules, consequently, the absorption axis may change, and light transmission can be modulated. Other embodiments may have different liquid crystal arrangements. In some embodiments, a sealant may be disposed about outer sides or lateral edges of the liquid crystal layer 630.

The quantum dot color filter array 660 may be disposed adjacent to the liquid crystal layer 630. The quantum dot color filter array 660 may be a film, an ink printed quantum dot layer, or may have a different configuration. In some instances, such as where the quantum dot color filter array 660 is a film, the quantum dot color filter array 660 may be coupled to the liquid crystal layer 630 with an optically clear adhesive. The quantum dot color filter array 660 may be the same as the quantum dot color filter arrays described with respect to FIGS. 1-5, and may include a first set of quantum dots 662 configured to emit light having a red color. The quantum dot color filter array 660 may include a second set of quantum dots 664 configured to emit light having a green color. The quantum dot color filter array 660 may include a third set of quantum dots 666 configured to emit light having a blue color. In some embodiments, rather than including the third set of quantum dots 666, a transparent material may be used as the light emitted by the one or more LEDs 612 may be of a blue color.

A second substrate 670 may be coupled to an opposite side of the quantum dot color filter array 660 relative to the liquid crystal layer 630. The second substrate 670 may be configured to support the quantum dot color filter array 660. In some embodiments, one or more electrodes may be disposed on the second substrate 670. The second substrate 670 may be formed of a clear material, such as a plastic film or glass in some embodiments. Accordingly, the second support substrate layer may be disposed between a reflector layer and the quantum dot color filter array, and the liquid crystal layer may be disposed on the quantum dot color filter array.

An optional reflector or absorber layer 680 may be disposed adjacent to the second substrate 670. The reflector or absorber layer 680 may be formed of aluminum, silver, a different type of metal, or a different material. The reflector or absorber layer 680 may be configured to reflect or absorb ambient light and/or light emitted by the LEDs 612. In some embodiments, the reflector or absorber layer 680 may be applied directly on the quantum dot color filter array 660. In embodiments where the layer 680 is an absorber, the absorber may absorb backwards light and the layer may be formed of, for example, carbon ink. The reflector or absorber layer 680 may therefore increase color conversion efficiency.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
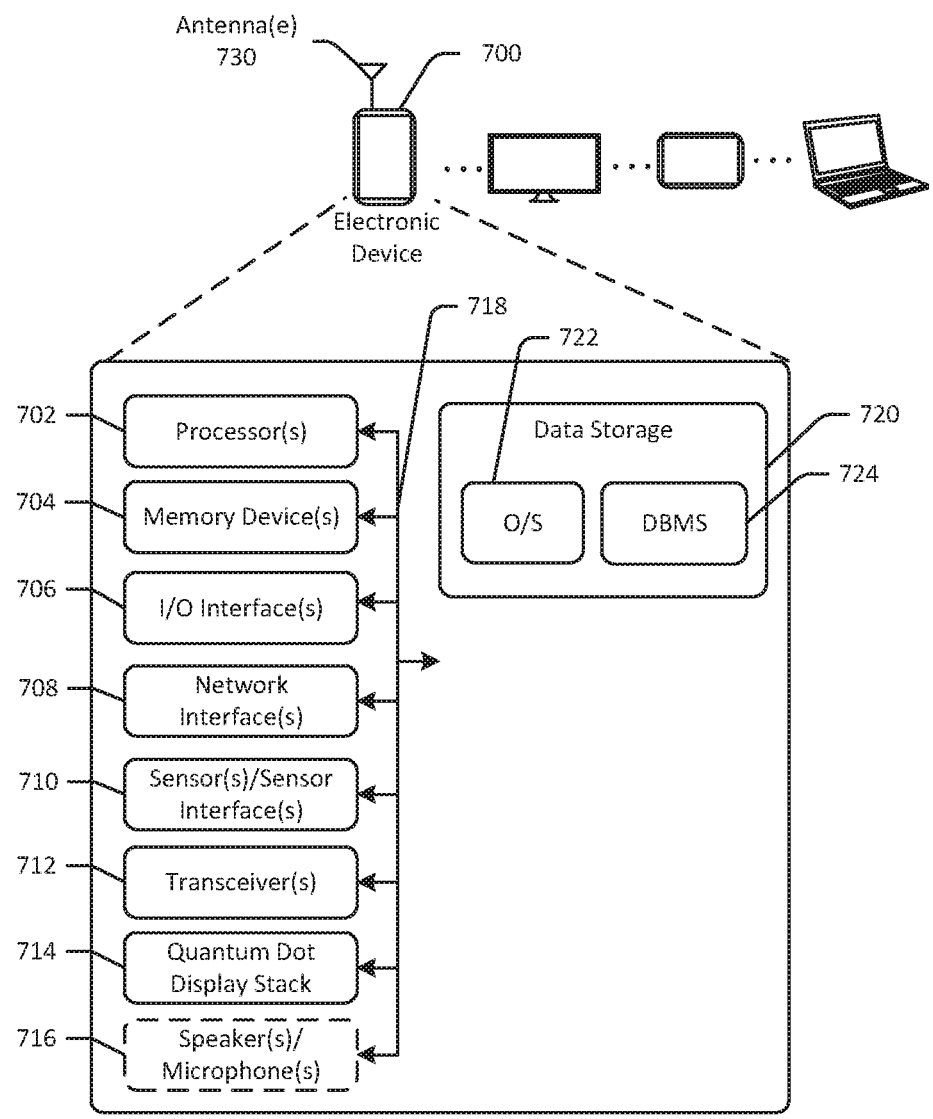
FIG. 7 schematically illustrates an example architecture of an electronic device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device including, but not limited to, a server system, a mobile device such as a smartphone, a tablet, an e-reader, a wearable device, or the like; a desktop computer; a laptop computer; a content streaming device; or the like. The electronic device(s) 700 may correspond to an illustrative device configuration for the device(s) of FIGS. 1-6.

The electronic device(s) 700 may be configured to communicate with one or more servers, user devices, or the like. The electronic device(s) 700 may be configured to render digital content.

The electronic device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more quantum dot display stack(s) 714, one or more optional microphone(s) 716, and data storage 720. The electronic device(s) 700 may further include one or more bus(es) 718 that functionally couple various components of the electronic device(s) 700. The electronic device(s) 700 may further include one or more antenna(e) 726 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the electronic device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the electronic device(s) 700 and the hardware resources of the electronic device(s) 700. More specifically, the O/S 722 may include a set of computer-executable instructions for managing the hardware resources of the electronic device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 724 may be any suitable lightweight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 726 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 726 may include any suitable type of antenna depending, for example, on the communications protocols used to transmit or receive signals via the antenna (e) 726. Non-limiting examples of suitable antennae may include directional antennae, non-directional antennae, dipole antennae, folded dipole antennae, patch antennae, multiple-input multiple-output (MIMO) antennae, or the like. The antenna(e) 726 may be communicatively coupled to one or more transceivers 712 or radio components to which or from which signals may be transmitted or received.

As previously described, the antenna(e) 726 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 726 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 726 may be configured to transmit or receive radio frequency signals within any suitable frequency range forming part of the unlicensed portion of the radio spectrum.

The antenna(e) 726 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 726—transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving—potentially in cooperation with any of antenna(e) 726—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals.

The transceiver(s) 712 may include any known receiver and baseband suitable for communicating via the communications protocols utilized by the electronic device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The quantum dot display stack(s) 714 may be a reflective quantum dot display stack, and may include reflective displays, such as liquid crystal displays, such as those described in conjunction with FIGS. 1-6. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 and/or methods of manufacturing any one of the embodiments of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6, if any, may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A reflective liquid crystal display for an electronic reader device comprising:
    a reflector layer;
    a quantum dot color filter array, the quantum dot color filter array comprising a first set of semiconductor nanocrystals configured to emit monochromatic red light, a second set of semiconductor nanocrystals configured to emit monochromatic green light, and a third set of semiconductor nanocrystals configured to emit monochromatic blue light;
    a first support substrate layer;
    a liquid crystal layer comprising liquid crystal molecules arranged in a matrix;
    a second support substrate layer disposed on the liquid crystal layer;
    a light emitting diode configured to emit blue light having a wavelength of between about 400 nanometers to about 450 nanometers;
    a light guide configured to propagate the blue light, the light guide disposed adjacent to the second support substrate layer, wherein the light emitting diode is optically coupled to an edge surface of the light guide;
    a touch sensor layer disposed on the light guide, the touch sensor layer configured to receive touch input; and
    a cover layer disposed on the touch sensor layer.

2. The reflective liquid crystal display of claim 1, wherein the liquid crystal layer is disposed on the first support substrate layer, and the quantum dot color filter array is disposed on the reflector layer, the reflective liquid crystal display further comprising:
    a first polarizer layer disposed between the quantum dot color filter array and the first support substrate layer, the first polarizer configured to polarize light reflected by the reflector layer; and
    a second polarizer layer disposed between the second support substrate layer and the light guide, the second polarizer layer configured to polarize ambient light that enters the reflective liquid crystal display.

3. The reflective liquid crystal display of claim 1, wherein the liquid crystal layer further comprises black dichroic dye molecules configured to absorb light in a planar orientation and to pass light in a perpendicular orientation.

4. The reflective liquid crystal display of claim 3, wherein the first support substrate layer is disposed between the reflector layer and the quantum dot color filter array, and wherein the liquid crystal layer is disposed on the quantum dot color filter array.

5. A reflective display structure comprising:
    a quantum dot color filter array;
    a first substrate;
    a second substrate;
    a reflective liquid crystal layer disposed between the first substrate and the second substrate, wherein the quantum dot color filter array is disposed on a first side of the reflective liquid crystal layer;
    a light guide disposed on a second side of the reflective liquid crystal layer; and
    a light emitting diode optically coupled to the light guide.

6. The reflective display structure of claim 5, further comprising:
    a first polarizer disposed between the quantum dot color filter array and the first substrate; and
    a second polarizer disposed between the second substrate and the light guide;
    wherein the reflective liquid crystal layer is coupled to the first substrate and the second substrate.

7. The reflective display structure of claim 5, wherein the light emitting diode is configured to emit ultraviolet light having a wavelength between about 300 nm and about 350 nm, or blue light having a wavelength between about 400 nm and about 465 nm.

8. The reflective display structure of claim 5, wherein the quantum dot color filter array is disposed adjacent to the first substrate, and the light guide is disposed adjacent to the second substrate, and wherein the reflective liquid crystal layer comprises black dichroic dye molecules configured to absorb light.

9. The reflective display structure of claim 5, wherein the quantum dot color filter array is disposed between the reflective liquid crystal layer and the first substrate, and the light guide is disposed adjacent to the second substrate.

10. The reflective display structure of claim 9, further comprising:
a reflector layer disposed adjacent to the first substrate, wherein the reflective liquid crystal layer comprises black dichroic dye molecules configured to absorb light.

11. The reflective display structure of claim 5, further comprising:
a first in-cell polarizer disposed between the quantum dot color filter array and the reflective liquid crystal layer; and
a second in-cell polarizer disposed between the reflective liquid crystal layer and the second substrate;
wherein the quantum dot color filter array is disposed between the first substrate and the first in-cell polarizer.

12. The reflective display structure of claim 5, wherein the quantum dot color filter array comprises a first set of semiconductor nanocrystals configured to emit monochromatic red light, and a second set of semiconductor nanocrystals configured to emit monochromatic green light.

13. The reflective display structure of claim 12, wherein the quantum dot color filter array further comprises a third set of semiconductor nanocrystals configured to emit monochromatic blue light.

14. The reflective display structure of claim 5, further comprising:
an electrode configured to apply a voltage of between about 3 volts to about 15 volts to the reflective liquid crystal layer;
wherein liquid crystal molecules of the reflective liquid crystal layer are configured to pass light while the voltage is applied.

15. A device display comprising:
a quantum dot color filter array;
an intensity modulator component comprising a first substrate, a second substrate, and a reflective liquid crystal layer disposed between the first substrate and the second substrate, wherein the quantum dot color filter array is disposed on a first side of the reflective liquid crystal layer;
a light guide disposed on a second side of the reflective liquid crystal layer; and
a light emitting diode optically coupled to the light guide, the light emitting diode configured to emit blue or ultraviolet light.

16. The device display of claim 15, wherein the intensity modulator component further comprises:
a first polarizer disposed between the quantum dot color filter array and the first substrate; and
a second polarizer disposed between the second substrate and the light guide.

17. The device display of claim 15, wherein the quantum dot color filter array is disposed adjacent to the intensity modulator component, and the light guide is disposed adjacent to the intensity modulator component, and wherein the reflective liquid crystal layer comprises black dichroic dye molecules configured to absorb light.

18. The device display of claim 15, wherein the quantum dot color filter array is disposed between the reflective liquid crystal layer and the first substrate, and the light guide is disposed adjacent to the second substrate.

19. The device display of claim 15, further comprising:
a reflector layer disposed adjacent to the quantum dot color filter array.

\* \* \* \* \*